(12) United States Patent
Paladini et al.

(10) Patent No.: US 9,582,926 B2
(45) Date of Patent: Feb. 28, 2017

(54) COHERENT MEMORY ACCESS IN MONTE CARLO VOLUME RENDERING

(71) Applicants: Gianluca Paladini, Skillman, NJ (US); John Paulus, Jr., Plainsboro, NJ (US)

(72) Inventors: Gianluca Paladini, Skillman, NJ (US); John Paulus, Jr., Plainsboro, NJ (US)

(73) Assignee: SIEMENS HEALTHCARE GMBH, Erlangen (DE)

( * ) Notice: Subject to any disclaimer, the term of this patent is extended or adjusted under 35 U.S.C. 154(b) by 87 days.

(21) Appl. No.: 14/719,469

(22) Filed: May 22, 2015

(65) Prior Publication Data

US 2016/0343161 A1 Nov. 24, 2016

(51) Int. Cl.
| | |
|---|---|
| G06T 15/50 | (2011.01) |
| G06T 15/08 | (2011.01) |
| G06T 15/06 | (2011.01) |
| G06T 15/80 | (2011.01) |
| G06T 17/20 | (2006.01) |

(52) U.S. Cl.
CPC ............. G06T 15/08 (2013.01); G06T 15/06 (2013.01); G06T 15/506 (2013.01); G06T 15/80 (2013.01); G06T 17/20 (2013.01); *G06T 2215/12* (2013.01)

(58) Field of Classification Search
CPC ....... G06T 15/06; G06T 15/506; G06T 15/80; G06T 11/008; G06T 13/20; G06T 15/08; G06T 15/50; G06T 2215/12; G06T 5/002; G06T 11/005; G06T 11/60; G06T 19/20; G06T 1/20; G06T 1/60; G06T 2207/10072; G06T 2215/16; G06T 2219/2012
See application file for complete search history.

(56) References Cited

U.S. PATENT DOCUMENTS

| | | | | |
|---|---|---|---|---|
| 2004/0243364 | A1* | 12/2004 | Wendelin | G02B 27/0012 703/2 |
| 2009/0167763 | A1* | 7/2009 | Waechter | G06T 15/06 345/426 |

(Continued)

OTHER PUBLICATIONS

Kroes, T., Post, F., Botha, C., "Exposure Render: An Interactive Photo-Realistic Volume Rendering Framework", pp. 1-10, vol. 7 No. 7, Jul. 2012.

(Continued)

*Primary Examiner* — Sultana M Zalalee (57) ABSTRACT

A method for Monte Carlo volume rendering in accordance with the present teachings includes: (a) tracing a plurality of light rays into a scene containing volumetric data, the light rays configured for simulating global illumination; (b) randomizing the scattering location and direction of the plurality of light rays through the volume, wherein a common sequence of random numbers is used in order for the scattering direction of each of the plurality of randomized scattered light rays to be substantially parallel; (c) computing at least one trilinearly interpolated and shaded sample along each of the plurality of randomized scattered light rays based on stored volumetric data, wherein at least a portion of the stored volumetric data used in at least a portion of the computing is configured for coherent access; and (d) rendering the volume with global illumination based on a plurality of iterations of the tracing, the randomizing, and the computing. Systems for Monte Carlo volume rendering are described.

18 Claims, 6 Drawing Sheets

(56) References Cited

U.S. PATENT DOCUMENTS

| | | | | |
|---|---|---|---|---|
| 2010/0033493 A1* | 2/2010 | Nutter | ................... | G06T 15/06 345/589 |
| 2013/0127895 A1* | 5/2013 | Miller | ................. | G06T 15/503 345/589 |
| 2013/0194268 A1* | 8/2013 | Wachter | ................ | G06T 15/06 345/426 |
| 2015/0215512 A1* | 7/2015 | Gautron | ................ | G06T 15/50 348/234 |

OTHER PUBLICATIONS

GPU Gems; Chapter 37., Volume Rendering Techniques; http://http.developer.nvidia.com/GPUGems/gpugems_ch39.html>, Sep. 29, 2014.

Ropinski, T., Döring, C., Rezk-Salama, C., "Interactive Volumetric Lighting Simulating Scattering and Shadowing", pp. 169-176, Mar. 2010.

Krüger, J., Westermann, R., "Acceleration Techniques for GPU-based Volume Rendering" Computer Graphics and Visualization Group, pp. 287-292, Oct. 2003.

Rezk-Salama, C., "GPU-Based Monte-Carlo Volume Raycasting" Computer Graphics Group, University of Siegen, Germany, pp. 411-414, 2007.

Salama, C., "GPU-Based Monte-Carlo Volume Raycasting" Computer Graphics Group, University of Siegen, Germany, pp. 1-4, 2007.

* cited by examiner

COHERENT MEMORY ACCESS IN MONTE CARLO VOLUME RENDERING

TECHNICAL FIELD

The present teachings relate generally to the field of computer graphics and, in some embodiments, to volume rendering of three-dimensional objects.

BACKGROUND

Monte Carlo path tracing is an iterative technique for rendering images of three-dimensional scenes using physical models of global illumination (e.g., to simulate light transport as it occurs in real life). The technique may be used to provide computer-generated photorealistic renderings of three-dimensional objects.

Monte Carlo path tracing may be used to render polygonal mesh models. Since no participating medium is traversed when rays are cast among polygons, volumetric data (e.g., three-dimensional arrays of voxels) may not be sampled in renderings of polygonal mesh models.

However, Monte Carlo path tracing methods may also be used to render volumetric data, a technique commonly known as Monte Carlo volume rendering. The volumetric data may be used, for example, to generate realistic cinematic special effects (e.g., heterogeneous participating media, such as fog, smoke, fire, and clouds; atmospheric effects, such as light beams passing through fog; etc.). Using Monte Carlo path tracing to render volumetric data is extremely computationally intensive because ray directions are randomized and samples are interpolated along each of the rays. The random access of voxel data from all of the randomly generated rays and all of the interpolations may be inefficient. Thus, since Monte Carlo path tracing methods are iterative and very time consuming, approximations may be made that provide comparable rendering results without requiring accurate computation of global illumination.

In some cases, volumetric data to be rendered may include three-dimensional volumes of medical data sets. If the volume to be rendered includes such medical data, gross approximations of global illumination to speed up rendering may be inadvisable since the rendered images of the medical data may be used for diagnostic purposes.

Despite the use of graphics processing units (GPUs) with thousands of processor cores to speed up computations, rendering volumetric data with Monte Carlo path tracing is still time consuming since thousands of samples are trilinearly interpolated along the paths of millions of scattered rays throughout the volume. Within each iteration, scattered rays may diverge significantly from one another. As a result, the interpolated volume samples along the rays may be far apart in the memory that stores the volumetric data. This in turn leads to poor performance since it causes non-optimal memory access patterns that do not preserve cache coherency while voxel samples are being interpolated along multiple rays being computed in parallel by multiple processor cores.

SUMMARY

The scope of the present invention is defined solely by the appended claims, and is not affected to any degree by the statements within this summary.

Volume rendering techniques based on conventional Monte Carlo path tracing with physically based global illumination may generate images of unprecedented quality but at the cost of very long processing time—thus making the techniques impractical for use in medical imaging systems. However, Monte Carlo volume rendering techniques in accordance with the present teachings may significantly reduce processing time (e.g., from minutes to seconds) by improving the coherency of parallel memory access to volumetric data. Cache coherency of memory access while multiple rays are being computed in parallel by multiple processes may be increased through the use of a sequence of pseudo-random values that is common among all parallel processes, which in turn causes pseudo-random ray scattering events to occur at locations close to each other and pseudo-random ray scattering directions to be aligned (e.g., parallel to each other). Such approach may result in significant performance improvements and produce less noisy images during each iteration. As a result, methods in accordance with the present teachings may be used in medical imaging software for the photorealistic visualization of three-dimensional and four-dimensional (e.g., 3D+ time) medical data (e.g., computed tomography data, ultrasound data, magnetic resonance data, positron emission tomography data, single photon emission computed tomography data, etc.).

By way of introduction, a computer-implemented method for Monte Carlo volume rendering in accordance with the present teachings includes: (a) tracing, by a computer processor, a plurality of light rays into a scene containing volumetric data, the light rays configured for simulating global illumination; (b) randomizing, by a computer processor, the scattering location and direction of the plurality of light rays through the volume, wherein a common sequence of random numbers is used in order for the scattering direction of each of the plurality of randomized scattered light rays to be substantially parallel; (c) computing, by the computer processor, at least one trilinearly interpolated and shaded sample along each of the plurality of randomized scattered light rays based on stored volumetric data; (d) rendering, by the computer processor, the volume with global illumination based on a plurality of iterations of the tracing, the randomizing, and the computing. At least a portion of the stored volumetric data used in at least a portion of the computing is configured for coherent access.

A system for Monte Carlo volume rendering in accordance with the present teachings includes: (a) a processor; (b) a non-transitory memory coupled to the processor; (c) first logic stored in the memory and executable by the processor to cause the processor to randomize a scattering direction of a light ray through a volume to be rendered, the light ray configured for simulating global illumination; (b) second logic stored in the non-transitory memory and executable by the processor to cause the processor to trace a plurality of randomized scattered light rays through the volume; (c) third logic stored in the non-transitory memory and executable by the processor to cause the processor to compute at least one trilinearly interpolated sample along each of the plurality of randomized scattered light rays based on stored volumetric data; and (d) fourth logic stored in the non-transitory memory and executable by the processor to cause the processor to render the volume based on a plurality of iterations of the randomizing, the tracing, and the computing. At least a portion of the stored volumetric data used in at least a portion of the computing is configured for coherent access.

A non-transitory computer readable storage medium in accordance with the present teachings has stored therein data representing instructions executable by a programmed processor for Monte Carlo volume rendering. The storage medium includes instructions for: (a) tracing a plurality of light rays into a scene containing volumetric data, the light rays configured for simulating global illumination; (b) randomizing the scattering location and direction of the plurality of light rays through the volume, wherein a common sequence of random numbers is used in order for the scattering direction of each of the plurality of randomized scattered light rays to be substantially parallel; (c) computing at least one trilinearly interpolated and shaded sample along each of the plurality of randomized scattered light rays based on stored volumetric data, wherein at least a portion of the stored volumetric data used in at least a portion of the computing is configured for coherent memory access; and (d) rendering the volume with global illumination based on a plurality of iterations of the tracing, the randomizing, and the computing.

DETAILED DESCRIPTION

Efficient methods for the computation of interpolated samples along scattered rays have been discovered and are described herein. Methods in accordance with the present teachings may be used to reduce processing time in Monte Carlo path tracing of three-dimensional volume data by reducing the time that it takes a parallel processor (e.g., a GPU or multi-core CPU) to access voxel data when computing interpolated samples along the path of randomly scattered rays used for global illumination. Methods in accordance with the present teachings use a pseudo-random scattering scheme that is common for all the ray paths traced in parallel through each image pixel and scattered within a volume during each iteration, forcing localized alignment between rays. This constrained alignment results in memory access patterns that maximize cache coherency and improve rendering speed.

Although conventional Monte Carlo path tracing may be used for rendering volumetric data with global illumination, a large number of iterations (e.g., 500 or more) may be needed before the rendered image converges to a noise-free, high quality result. On modern GPUs, such a large number of iterations may take several seconds to render a small 512×512 image of a 512-cube volume. The amount of time increases to several minutes when rendering higher resolution images (e.g., the 1920×1080 resolution of a monitor display, or the even higher resolution displays that are commercially available).

Figure 2:
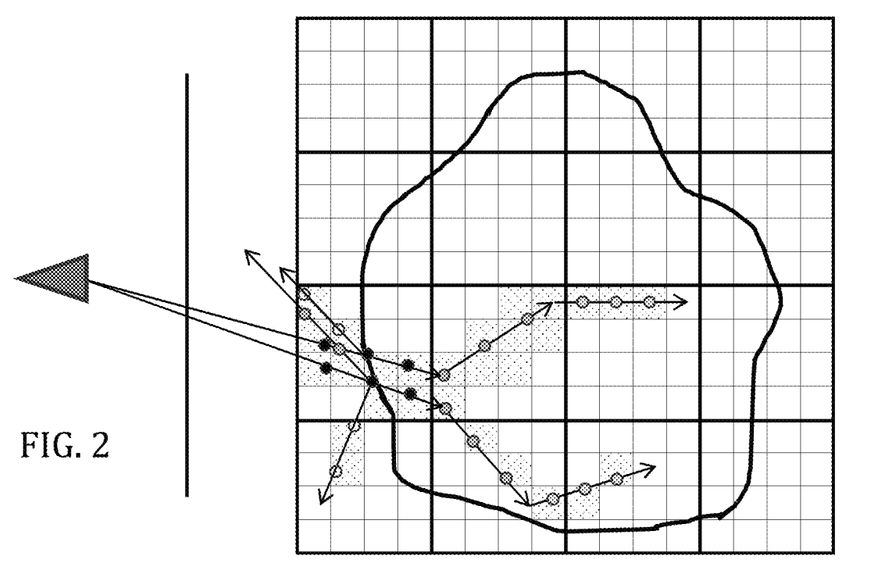
FIG. 2 shows an example of Monte Carlo path tracing though a volume wherein light rays are scattered at random positions and random directions that are different for each ray being traced in parallel through each image pixel by multiple processes.

For each iteration of conventional Monte Carlo path tracing, secondary rays may be randomly scattered in different directions that diverge significantly from one another, which may result in slower processing times. FIG. 2 shows an example of ray tracing wherein the randomized scattering directions of light rays in a volume are different. In FIG. 2, the triangle 202 represents the eye position (e.g., viewing position). The vertical line 204 represents an image plane that is perpendicular to the plane of the drawing. In FIG. 2, the image 230 represents a cross-section of a brain. During each iteration, for each pixel of the two-dimensional image shown in FIG. 2—for example, a first pixel 210 and an adjacent second pixel 212—a corresponding ray is cast, with each ray being processed in parallel by a multi-core CPU or GPU. By way of example, a first ray 206 is cast for the first pixel 210 and a second ray 208 is cast for the second pixel 212.

As the first ray 206 and the second ray 208 enter the volume, trilinearly interpolated sample values are calculated along each of the rays. For example, in FIG. 2, a first set of values represented by the dark blue dots 214a, 214b, and 214c is calculated along the first ray 206, and a second set of values represented by the dark blue dots 216a, 216b, and 216c is calculated along the second ray 208. Initially, the first set of values, 214a, 214b, and 214c, and the second set of values, 216a, 216b, and 216c, are fairly close to one another. Thus, at least initially, memory locations in the volume that are fairly close together may be accessed, and coherency for the time being is fairly good.

However, upon encountering a volume that causes a ray to scatter (e.g., a scatter location), different rays may scatter in quite different random directions. For example, as shown in FIG. 2, the first ray 206 scatters in a random downward direction, and the second ray 208 scatters in a random upward direction. As a result, the interpolated samples 224a, 224b, and 224c calculated along the first downward scattered ray 220, and the interpolated samples 222a, 222b, and 222c calculated along the second upward scattered ray 218, may reside in different portions of the voxel memory. Thus, memory access is no longer coherent.

A GPU may arrange memory into bricks of data (e.g., 8-cube bricks, 16-cube bricks, 32-cube bricks, etc.). Volumetric data may be partitioned into voxels, and the voxels may be organized into bricks. In FIG. 2, the volume to be rendered is shown on a grid. The thicker lines of the grid define 4×4 square regions that correspond to 4×4×4 bricks of voxel data. As shown in FIG. 2, two out of three of a first set of interpolated samples represented by the green dots 224b and 224c reside in a first brick 228 of memory, whereas one of the first set of interpolated samples represented by the green dot 224a, as well as all of a second set of interpolated samples represented by the green dots 222a, 222b, and 222c reside in a second brick 226 of memory. Since the volumetric data for first scattered ray 220 and second scattered ray 218 reside in different bricks, memory access is not coherent. This lack of coherency may be further exacerbated in subsequent scattering events, as shown, for example, by the pink dots in FIG. 2.

Thus, to compute interpolated volume samples along a scattered ray, access to voxel values in a memory storage location that is far apart from values being interpolated for other scattered rays may occur. As a consequence, in parallel computing processor architectures (e.g., GPUs and multi-core CPUs) wherein scattered rays may be processed simultaneously in parallel by multiple cores, each core may end up accessing a memory location that is far apart from memory locations accessed by other cores and, therefore, unlikely to fit in the processor's memory cache, thereby resulting in slower memory access.

It is to be understood that elements and features of the various representative embodiments described below may be combined in different ways to produce new embodiments that likewise fall within the scope of the present teachings.

Figure 1:
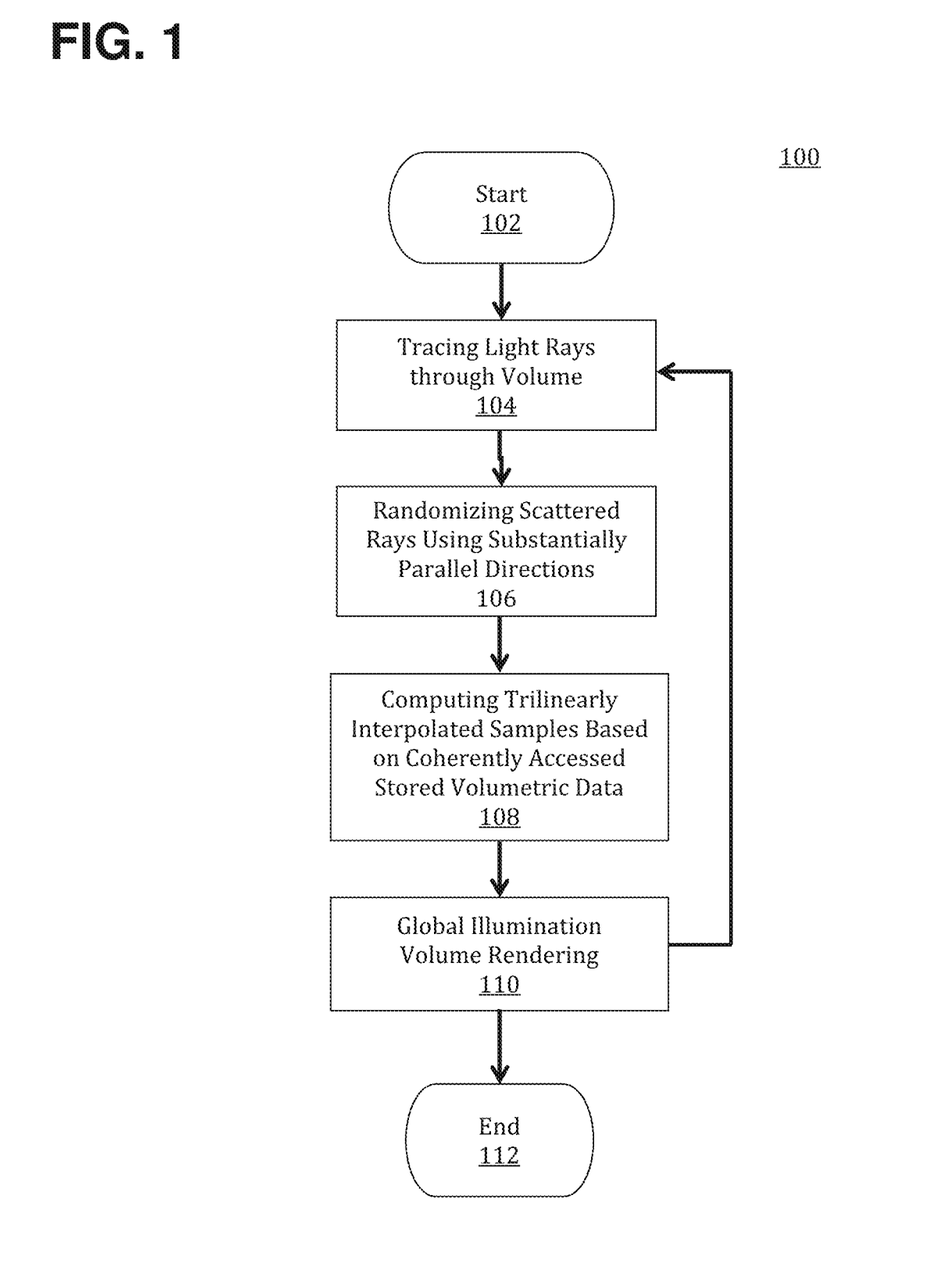
FIG. 1 shows a flow chart of a representative process for Monte Carlo volume rendering in accordance with the present teachings.

By way of general introduction, as shown in FIG. 1, an exemplary method 100 for Monte Carlo volume rendering in accordance with the present teachings begins iterating at block 102 and includes: (a) tracing 104 a plurality of light rays into a scene containing volumetric data, the light rays configured for simulating global illumination; (b) randomizing 106 the scattering location and direction of the plurality of light rays through the volume, wherein a common sequence of random numbers is used in order for the scattering direction of each of the plurality of randomized scattered light rays to be substantially parallel; (c) computing 108 at least one trilinearly interpolated and shaded sample along each of the plurality of randomized scattered light rays based on stored volumetric data, wherein at least a portion of the stored volumetric data used in at least a portion of the computing is configured for coherent access; and (d) rendering 110 the volume with global illumination based on a plurality of iterations of the tracing, the randomizing, and the computing. The method 100 ends at block 112.

It is to be understood that the relative ordering of some acts shown in the exemplary flow chart of FIG. 1 is meant to be merely representative rather than limiting, and that alternative sequences may be followed. Moreover, it is likewise to be understood that additional, different, or fewer acts may be provided. Moreover, in alternative embodiments, these acts may occur in a different sequential order and/or one or more of these acts may occur substantially contemporaneously.

In some embodiments, a method for Monte Carlo volume rendering in accordance with the present teachings is implemented using a computer and, in some embodiments, one or a plurality of the acts of (a) randomizing 104, (b) tracing 106, (c) computing 108, and/or (d) rendering 110 described above are performed by one or a plurality of processors. The processors are able to render more quickly and consistently than a person. For time-constrained medical environments, processor-based image generation assists diagnosis and/or treatment in ways that a human created image could not.

In some embodiments, the computer processor used in accordance with the present teachings includes a plurality of cores. The plurality of cores may be configured to perform parallel processing on the plurality of randomized scattered light rays. In some embodiments, each core of the plurality of cores is independently configured to perform the computing for a respective randomized scattered light ray. In some embodiments, the computer processor includes a graphics processing unit, a multi-core central processing unit, or a combination thereof.

In accordance with the present teachings, data processing speed may be improved by providing coherent access to data memory storage. The phrase "coherent memory access" refers to the ability to access memory locations that are near (e.g., or, in some embodiments, next to) each other in the memory cells of memory storage hardware (e.g., as opposed to random access within memory). If memory access is not coherent, then data processing speeds are slower. In coherent memory access, each data value being accessed by a processing core may be adjacent or near the memory location of previously accessed values. Thus, when the processor accesses the memory storage, the processor may move larger amounts of data onto a fast processor's cache in anticipation that these data will be accessed next. In addition, three-dimensional volumetric data may be partitioned into a set of smaller cubes or "bricks" that improve data access locality. When samples are interpolated using data that fit within a processor cache or within smaller volume bricks, the parallel computation of multiple scattered rays may be fast. However, when scattered rays diverge from each other and cover different parts of memory storage, the simultaneous access to the different memory locations may be substantially slower.

In accordance with the present teachings, processing time may be reduced by improving the coherency of parallel memory access to stored volumetric data. In some embodiments, improved coherency may be achieved by providing at least a portion of the stored volumetric data used in at least a portion of the computing in a cache. In some embodiments, the stored volumetric data may be partitioned into a plurality of voxels, and the plurality of voxels may be organized into a plurality of cubic bricks. In such embodiments, improved coherency may be achieved by providing at least a portion of the stored volumetric data used in at least a portion of the computing in a common cubic brick.

Although the first few iterations of an approach as described herein may generate images that are strongly biased towards a small number of directions, scattering is still randomized at each iteration. Moreover, after a couple of hundred iterations, the rendered image converges to substantially the same result that would be obtainable by a conventional Monte Carlo approach, although results in accordance with the present teachings may be obtained in substantially less time as a result of improved cache coherency.

In some embodiments, Monte Carlo random scattering in accordance with the present teachings uses a pseudo-random generator that relies on an initial seed value. During each iteration, instead of varying the seed value for every ray being cast through each (x,y) pixel in an image, the same seed value is used for all of the rays. Thus, all of the rays being computed during one iteration are scattered based on the same set of pseudo-random values generated by a function rand( ) returning floating point numbers between 0.0 and 1.0 based on the same initial seed value—for example fract(sin(seed++)*N) where N is a constant hash number, seed is the iteration number, and ++ is an operator that increments the seed value every time the rand( ) function is called. As a result, rays that are cast simultaneously for each adjacent pixel will incur scattering events at locations that are in close proximity with each other, since the random function controlling scattering position—for example a Woodcock tracking function based on −log (rand( ))—will be driven by the same pseudo-random value; scattered rays emanating from such locations will have the same type of scattering, since the random function deciding whether a scattered ray is to be reflected or transmitted—for example choosing whether to use a bidirectional reflection distribution function or phase function based on rand( )< 1.0−exp(−10*GradientMagnitude)—will be driven by the same pseudo-random value; and reflected or transmitted rays will have the same direction, since the random function computing such direction—such as normalize(vec3(rand( )−0.5, rand( )−0.5, rand( )−0.5)—will be driven by the same pseudo-random value. The resulting scattered rays are strongly aligned with one another and, therefore, the interpolated voxel values along those rays are more likely to fall within the same memory storage area of the volume. Since most CPU and GPU processors rely on caching to improve the access speed of adjacent values in memory (a.k.a. coherent memory access), the aligned scattering greatly improves cache coherency and, therefore, is substantially faster than conventional methods. In some embodiments, methods in accordance with the present teachings are used in GPU-based implementations, where rays may be cast simultaneously for each image pixel due to the massively parallel architecture of the GPU.

All manner of stored volumetric data is contemplated for use in accordance with the present teachings, including but not limited to medical datasets. Representative medical volumetric data for use in accordance with the present teachings include but are not limited to computed tomography (CT) data, ultrasound data, magnetic resonance (MR) data, positron emission tomography (PET) data, single photon emission computed tomography (SPECT) data, and/or the like, and combinations thereof.

In accordance with the present teachings, coherency of memory access may be increased by modifying the process of random scattering. For example, in accordance with the present teachings, secondary rays may be kept aligned during random scattering in the volume. Thus, instead of scattering secondary rays in completely different random directions as is done conventionally, constraints may be introduced so that the random function used in scattering computations yields the same exact sequence of random numbers for each parallel process computing scattered rays simultaneously. As a result, each parallel processing core may generate scattered rays that are aligned with the rays generated by other processing cores. In some embodiments, as shown in FIG. 3, the scattering direction of each of the plurality of randomized scattered light rays is substantially parallel.

Figure 3:
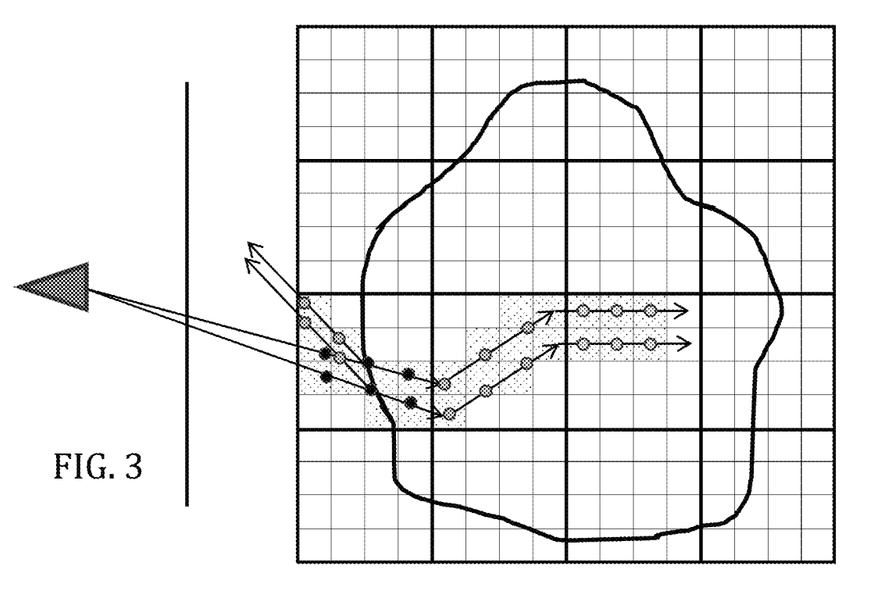
FIG. 3 shows an example of Monte Carlo path tracing wherein light rays are scattered at pseudo-random positions that are close to each other and pseudo-random directions that are the same for each ray being traced in parallel through each image pixel by multiple processes in accordance with the present teachings.

FIG. 3 shows an example of ray tracing wherein the randomized scattering directions of light rays in a volume are substantially parallel in accordance with the present teachings. Substantially parallel allows for deviation by less than 5 degrees. As shown in FIG. 3, a first ray 302 and a second ray 304 enter the volume, and trilinearly interpolated sample values are calculated along each of the rays. For example, in FIG. 3, a first set of values represented by three dark blue dots is calculated along the first ray 302, and a second set of values represented by three additional dark blue dots is calculated along the second ray 304. Upon encountering first respective scatter locations, the first ray 302 and the second ray 304 scatter in substantially the same random direction, whereby a first scattered ray 306 and a second scattered ray 308 are substantially parallel. Similarly, upon encountering second respective scatter locations, the first scattered ray 306 and the second scattered ray 308 also scatter in substantially the same random direction, whereby a third scattered ray 312 and a fourth scattered ray 314 are also substantially parallel. As shown in FIG. 3, the interpolated samples calculated along the first scattered ray 306 (e.g., represented by three green dots), and the interpolated samples calculated along the second scattered ray 308 (e.g., represented by three additional green dots) reside in the same brick 310 of memory. Similarly, the interpolated samples calculated along the third scattered ray 312 (e.g., represented by three pink dots), and the interpolated samples calculated along the fourth scattered ray 314 (e.g., represented by three additional pink dots) likewise reside in a common brick 316 of memory. Since the volumetric data for first scattered ray 306 and second scattered ray 308 reside in the same brick 310, and since the volumetric data for third scattered ray 312 and fourth scattered ray 314 also reside in a common brick 316, cache coherency is maximized and rendering speed is increased. It should be noted that in some instances, the scattering direction of two or more simultaneously cast rays may not be the same or similar since each ray is traced through different portions of the volume and rays that are close to one another may not always hit the same type of features in the volume.

In accordance with the present teachings, a pseudo-random number generator may be used for determining the random scattering directions of the light rays, such that the random directions being computed from the parallel cores are substantially the same. Thus, as shown in FIG. 3, the rays being scattered by each one of the cores may be parallel (e.g., going in the same random directions). As a result, each of the cores may end up accessing memory locations that are very close to one another, thereby increasing the speed by at least a factor of two.

In accordance with the present teachings, the scattering direction of each of the plurality of randomized scattered light rays may be derived from a pseudo-random number generator based on a common sequence of random numbers. The common sequence of random numbers may be obtained in a variety of ways.

For example, in some embodiments, a pseudo-random number generator that relies on an initial seed value may be used. In such embodiments, the common sequence of random numbers may be obtained by using the same seed value for each parallel processing act, such that the resulting pseudo-random sequence is the same for each cast ray. In other words, for each iteration of the randomizing, a common seed number may be input into the pseudo-random number generator.

In other embodiments, the common sequence of random numbers may be obtained by pre-computing, for each iteration of the randomizing, a sequence of random numbers used by a random scattering function, and using the same pre-computed sequence of random numbers for each processing act.

In further embodiments, the common sequence of random numbers may be obtained by pre-computing, for each iteration of the randomizing, a set of scattered random directions, and using the same set of scattered random directions for each processing act.

When rendering multiple Monte Carlo ray traced images as part of an animated sequence, the same pseudo-random set of memory-coherent scattering directions may be used for each frame. For example, if each frame is rendered with 500 iterations, the set of random numbers used in the 500 iterations for the first frame may be the same set of random numbers used in the 500 iterations for each subsequent frame. This ensures a more consistent appearance of the rendered results from frame to frame in an animated sequence. The common set of random numbers may be achieved through the use of the same seed value in a pseudo-random number generator. In some embodiments, for simplicity, the iteration number may be used as the seed value.

In some embodiments, processing performance may be further increased by modifying the spacing of interpolated samples computed along each of the randomized scattered light rays. In some embodiments, the distance between samples may be increased per scatter event. In other embodiments, the distance between samples may be increased based on distance traveled.

In some embodiments, sample spacing along memory-coherent, parallel scattered directions may be increased by a fixed amount at each consecutive scattering event generating a new scattered ray. In other words, for each iteration of the computing, sample spacing may be increased by a fixed amount along each of the plurality of randomized scattered light rays. As long as the distance is increased by the same amount for all of the parallel scattered rays, the parallel processing acts will access the corresponding memory locations in a coherent fashion. This approach provides an approximation to compute less interpolated samples for faster performance.

By way of example, as shown in FIG. 3, the initial sampling rate may be represented by the distance between the dark blue dots on the first ray 302 and the distance between the dark blue dots on the second ray 304. This initial sampling rate may be kept within the Nyquist limit (e.g., about half the size of one voxel, or about the same size as one voxel). After scattering begins, the sampling distance (e.g., the distances between the green dots on the first scattered ray 306 and the distances between the green dots on the second scattered ray 308, and/or the distances between the pink dots on the third scattered ray 312 and the distances between the pink dots on the fourth scattered ray 314) may be increased (not shown in FIG. 2). The contribution of interpolated samples computed from scattering that takes place far away from the original surface may have reduced importance with respect to the overall result and, therefore, the sampling may be sparser in order to speed up performance.

In other embodiments, the sample spacing along memory-coherent parallel scattered directions may be gradually increased for each sampling act as a function of distance from the scattering ray origin. As long as the distance is increased by the same amount for all of the parallel scattered rays, the parallel processing acts will access the corresponding memory locations in a coherent fashion. This approach is based on an assumption that samples that are further away from a scattering point contribute less to the global illumination of that point. Consequently, less interpolated samples are computed for faster performance.

In other words, the greater the distance traveled while scattering, the more the sampling rate may be increased. In some embodiments, each scattered ray receives a different sampling rate (e.g., every time a ray is scattered, the sampling distance may be doubled). Alternatively, distance may be increased for each point.

In further embodiments, increasing sample spacing along memory-coherent parallel scattered directions may be used as a criterion for selecting a different three-dimensional volume from which the sample should be interpolated. For example, at least a portion of the stored volumetric data may be sub-sampled to obtain one or a plurality of lower resolution sub-samples of at least a portion of the stored volumetric data. Thus, instead of having just one volume at one resolution, there may be a collection of volumes re-sampled at different levels of resolution. One or more sub-sampled volumes may have courser resolution as compared to the original volume.

As sampling distance increases and samples become spaced farther apart, it may not be necessary to access memory within the original high-resolution volume. Rather, lower resolution versions of the volume may be accessed instead, thereby providing more coherent and faster memory access and improving performance. In some embodiments, if a sample spacing of an initial iteration of the computing is less than a sample spacing of a subsequent iteration of the computing, then the lower resolution sub-sample may be accessed for the computing for each of the plurality of randomized scattered light rays. If sample spacing is the same as a chosen sampling rate, the original volume may be used. However, as the sample spacing increases to larger values, pre-computed subsampled copies of the volume may be used instead. Memory coherence may be increased since samples that are further apart in the original volume may be closer together in sub-sampled copies of the volume. As part of the pre-processing act that computes the subsampled volumes, low-pass filtering may be used so that sub-sampled values do not introduce aliasing.

Figure 4:
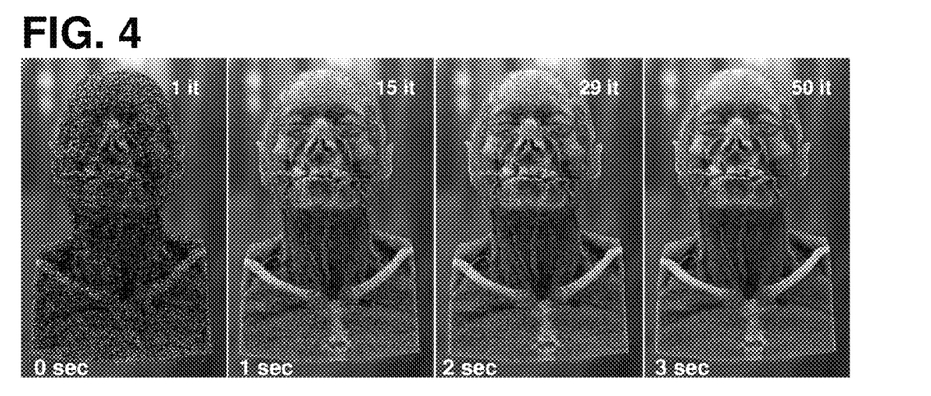
FIG. 4 shows an example of rendering results achieved in the first 3 seconds of a fully random scattering process.

FIG. 4 shows an example of rendering results achieved in the first 3 seconds of a conventional, fully random scattering process. As shown in FIG. 4, the first frame obtained using a conventional, fully random scattering process is very noisy because rays are going in myriad directions. As more iterations are computed and averaged over time, the rendering result becomes progressively better. As shown in FIG. 4, 50 iterations are achieved in the first 3 seconds.

Figure 5:
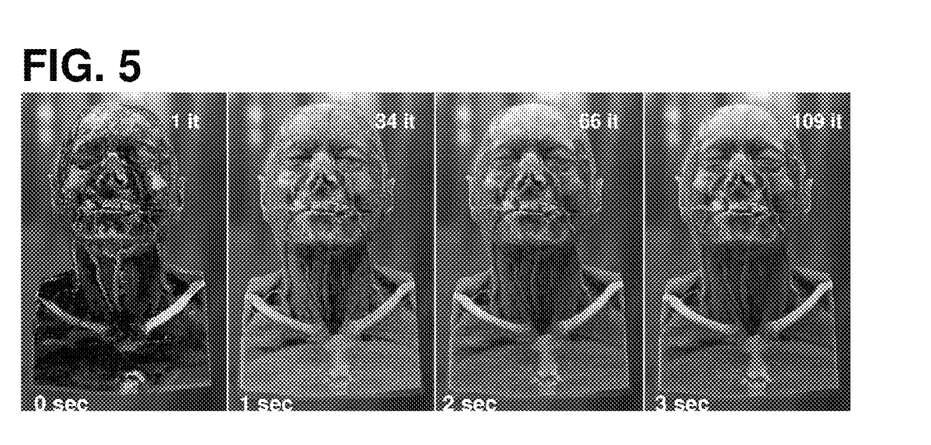
FIG. 5 shows an example of rendering results achieved in the first 3 seconds of a memory-coherent scattering process in accordance with the present teachings.

FIG. 5 shows an example of rendering results achieved in the first 3 seconds of a memory-coherent scattering process in accordance with the present teachings. As shown in FIG. 5, the rendering images that are produced—at least initially—look strongly biased towards specific directions as opposed to the noisy appearance of the rendering result obtained after 1 second as shown in FIG. 4. However, as the iterations are averaged over time, the rendering results shown in FIG. 5 look similar to the rendering results shown in FIG. 4 although the iterations take considerably less time. For example, as shown in FIG. 5, 109 iterations are achieved in 3 seconds using a memory-coherent scattering approach in accordance with the present teachings as opposed to only 50 iterations in the same amount of time using a conventional approach. In other words, the processing speed of the memory-coherent scattering approach in accordance with the present teachings is more than double the processing speed of the conventional approach.

Figure 6A:
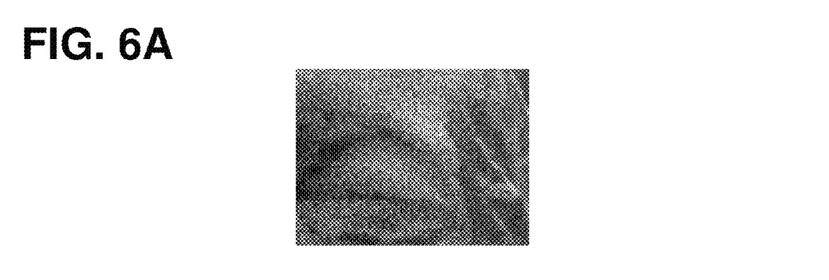
FIG. 6A shows a detailed view of an example of rendering results achieved by a fully random scattering process.
Figure 6B:
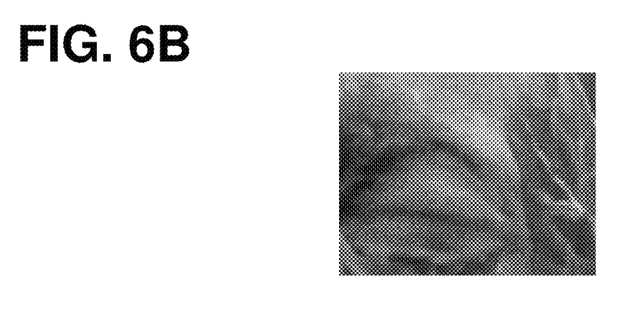
FIG. 6B shows a detailed view of an example of rendering results achieved by a memory-coherent scattering process in accordance with the present teachings.

Moreover, since the set of random scattered directions for each iteration varies less with a method in accordance with the present teachings (e.g., FIG. 5) as compared with a conventional approach (e.g., FIG. 4), the rendering result at each iteration is less noisy. FIGS. 6A and 6B show, respectively, detailed views of exemplary rendering results achieved by a fully random scattering process and a memory-coherent scattering process in accordance with the present teachings. The rendering result shown in FIG. 6B is substantially less noisy than the rendering result shown in FIG. 6A.

In some embodiments, a graphical user interface may be used to depict the results of Monte Carlo volume rendering in accordance with the present teachings, and to allow an operator to interact with and analyze the rendering result.

In some embodiments, as described above, the present teachings provide methods for Monte Carlo volume rendering. In other embodiments, as further described below, the present teachings also provide systems for Monte Carlo volume rendering.

Figure 7:
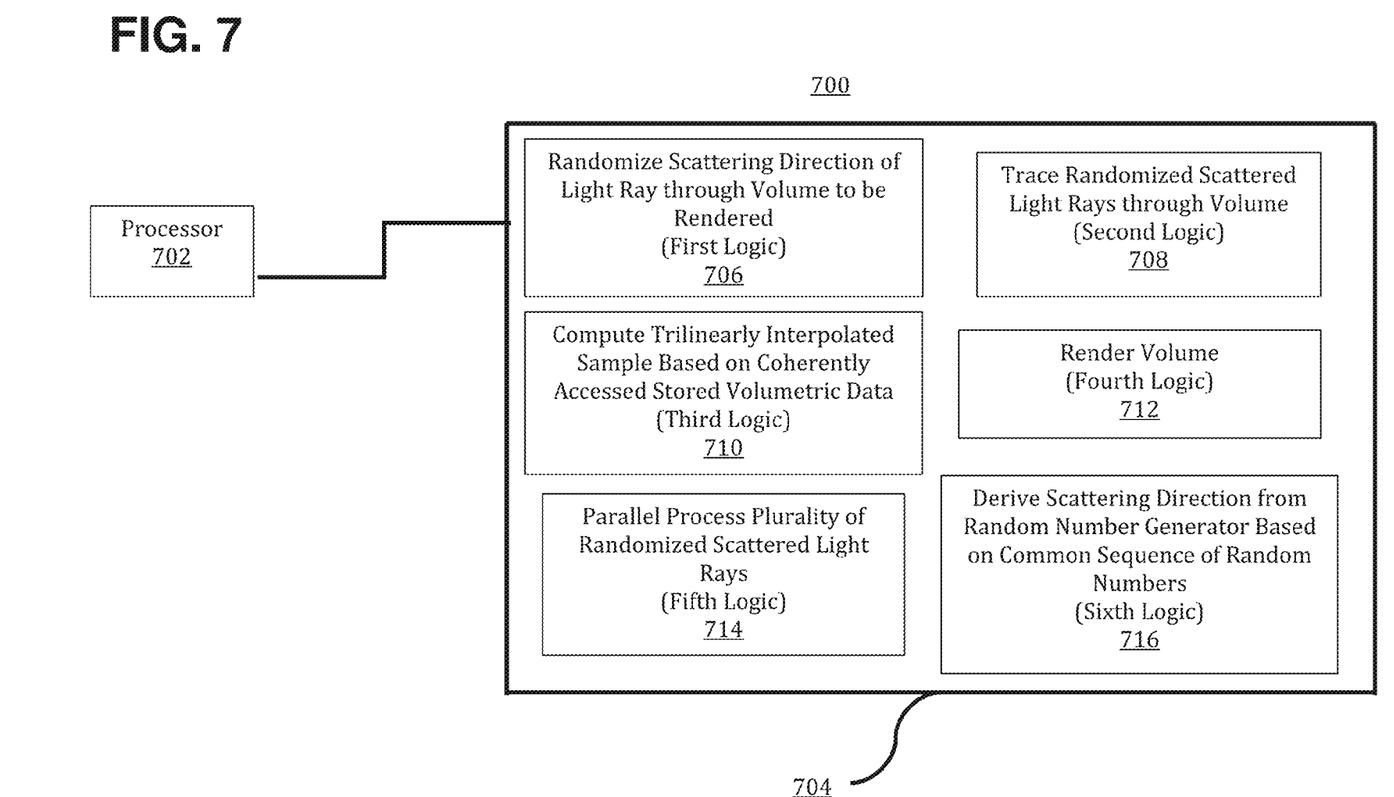
FIG. 7 shows a block diagram of a representative system for Monte Carlo volume rendering in accordance with the present teachings.

FIG. 7 shows a block diagram of a representative system 700 for Monte Carlo volume rendering in accordance with the present teachings. In some embodiments, the system 700 is implemented as part of a volume-rendering module in a computer system. As shown in FIG. 7, the system 700 includes: a processor 702; a non-transitory memory 704 coupled with the processor 702; first logic 706 stored in the non-transitory memory 704 and executable by the processor 702 to cause the processor 702 to randomize a scattering direction of a light ray through a volume to be rendered, the light ray configured for simulating global illumination; second logic 708 stored in the non-transitory memory 704 and executable by the processor 702 to cause the processor 702 to trace a plurality of randomized scattered light rays through the volume; third logic 710 stored in the non-transitory memory 704 and executable by the processor 702 to cause the processor 702 to compute at least one trilinearly interpolated sample along each of the plurality of randomized scattered light rays based on stored volumetric data, wherein at least a portion of the stored volumetric data used in at least a portion of the computing is configured for coherent access; and fourth logic 712 stored in the non-transitory memory 704 and executable by the processor 702 to cause the apparatus 700 to render the volume based on a plurality of iterations of the randomizing, the tracing, and the computing.

In some embodiments, the apparatus 700 may further include one or more of the following: fifth logic 714 stored in the non-transitory memory 704 and executable by the processor 702 to cause the apparatus 700 to perform parallel processing on the plurality of randomized scattered light rays, wherein each core of a plurality of cores is independently configured to compute the at least one trilinearly interpolated sample for a respective randomized scattered light ray; and/or sixth logic 716 stored in the non-transitory memory 704 and executable by the processor 702 to cause the apparatus 700 to derive the scattering direction of each of the plurality of randomized scattered light rays from a pseudo-random number generator based on a common sequence of random numbers.

In some embodiments, the system 700 may be coupled to other modules of a computer system and/or to databases so as to have access to relevant information as needed (e.g., volumetric data, patient history information, etc.) and initiate appropriate actions.

A non-transitory computer-readable storage medium in accordance with the present teachings has stored therein data representing instructions executable by a programmed processor for Monte Carlo volume rendering. The storage medium includes instructions for: (a) randomizing a scattering direction of a light ray through a volume to be rendered, the light ray configured for simulating global illumination; (b) tracing a plurality of randomized scattered light rays through the volume; (c) computing at least one trilinearly interpolated sample along each of the plurality of randomized scattered light rays based on stored volumetric data, wherein at least a portion of the stored volumetric data used in at least a portion of the computing is configured for coherent access; and (d) rendering the volume based on a plurality of iterations of the randomizing, the tracing, and the computing.

One or more modules or logic described herein may be implemented using, among other things, a tangible computer-readable medium comprising computer-executable instructions (e.g., executable software code). Alternatively, modules may be implemented as software code, firmware code, hardware, and/or a combination of the aforementioned.

Example pseudo code or logic for implementing one embodiment is represented as:

```
for every iteration to compute an image
{
    for every ray casted through each pixel in the image plane
    (computed in parallel)
    {
        seed = iteration number
        // Define rand( ) as a function of seed value
        float rand( ) { return fract(sin(seed++)*43758.5453123); }
        S = -log(rand( ))
        Sum = 0
        freePath = false
        vec4 rayColor = vec4(1.,1.,1.,0.);
        while ((scatterCount-- > 0) && (!freePath))
        {
            while(true)
            {
                Move to next incremental sample position
                If sample is out of volume
                {
                    freePath = true
                    exit while
                }
                Trilinearly interpolate sample value
                Get color and opacity corresponding to sample value
                If (sample opacity > 0)
                {
                    Sum += sample opacity * densityPerSample
                    If (Sum > S)
                    {
                        Compute new scatter Direction
                        Direction = normalize(vec3(rand( )-.5,
                        rand( )-.5, rand( )-.5)
                        // BRDF
                        Compute gradient
                        PdfBrdf = (1.0 - exp(-10. * gradient-
                        Magnitude))
                        If (rand( ) < PdfBrdf)
                        {
                            if(gradientMagnitude > 0)
                                Modulate sampleColor by light map
                                shading
                        }
                        // BTDF
                        Modulate rayColor.rgb by sampleColor.rgb
                        Exit while
                    }
                }
            }
        }
        If freePath = true
        {
            Modulate ray color by light map shading
            outColor.rgb = rayColor.rgb
        }
        else
            outColor.rgb = 0
    }
    Add outColor to accumulated pixel color
}
for every pixel in the image
{
    Final pixel color = accumulated color / number of iterations
}
```

Figure 8:
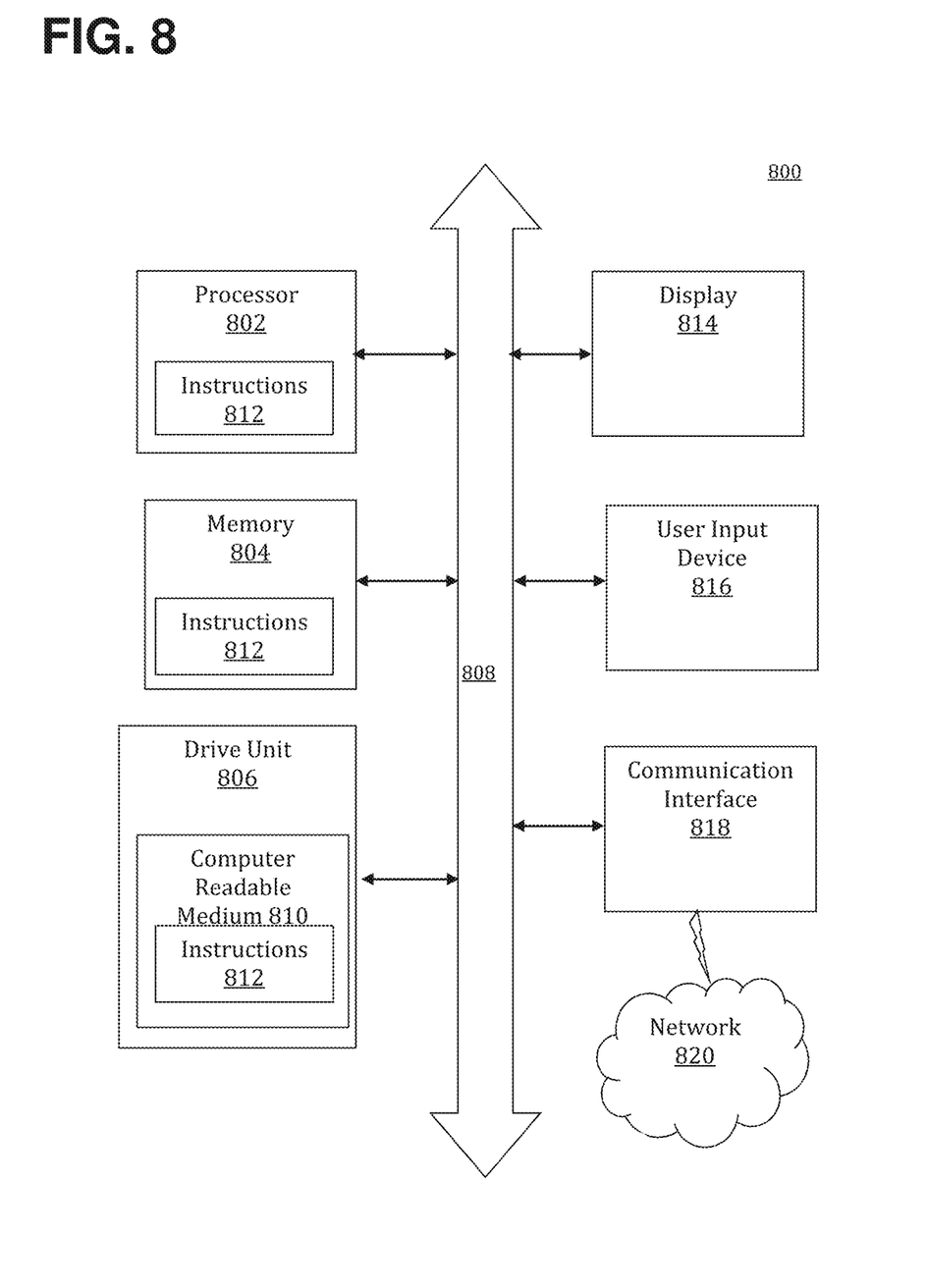
FIG. 8 shows a representative general computer system for use with a system in accordance with the present teachings.

FIG. 8 depicts an illustrative embodiment of a general computer system 800. The computer system 800 can include a set of instructions that can be executed to cause the computer system 800 to perform any one or more of the methods or computer based functions disclosed herein. The computer system 800 may operate as a standalone device or may be connected (e.g., using a network) to other computer systems or peripheral devices. Any of the components discussed above, such as the processor, may be a computer system 800 or a component in the computer system 800. The computer system 800 may implement a volume rendering system, of which the disclosed embodiments are a component thereof.

In a networked deployment, the computer system 800 may operate in the capacity of a server or as a client user computer in a client-server user network environment, or as a peer computer system in a peer-to-peer (or distributed) network environment. The computer system 800 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In some embodiments, the computer system 800 may be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As shown in FIG. 8, the computer system 800 may include a processor 802, for example a central processing unit (CPU), a graphics-processing unit (GPU), or both. The processor 802 may be a component in a variety of systems. For example, the processor 802 may be part of a standard personal computer or a workstation. The processor 802 may be one or more general processors, digital signal processors, application specific integrated circuits, field programmable gate arrays, servers, networks, digital circuits, analog circuits, combinations thereof, or other now known or later developed devices for analyzing and processing data. The processor 802 may implement a software program, such as code generated manually (i.e., programmed).

The computer system 800 may include a memory 804 that may communicate via a bus 808. The memory 804 may be a main memory, a static memory, or a dynamic memory. The memory 804 may include, but is not limited to, computer-readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In some embodiments, the memory 804 includes a cache or random access memory for the processor 802. In alternative embodiments, the memory 804 is separate from the processor 802, such as a cache memory of a processor, the system memory, or other memory. The memory 804 may be an external storage device or database for storing data. Examples include a hard drive, compact disc (CD), digital video disc (DVD), memory card, memory stick, floppy disc, universal serial bus (USB) memory device, or any other device operative to store data. The memory 804 is operable to store instructions executable by the processor 802. The functions, acts or tasks illustrated in the figures or described herein may be performed by the programmed processor 802 executing the instructions 812 stored in the memory 804.

The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown in FIG. 8, the computer system 800 may further include a display unit 814, such as a liquid crystal display (LCD), an organic light emitting diode (OLED), a flat panel display, a solid state display, a cathode ray tube (CRT), a projector, a printer or other now known or later developed display device for outputting determined information. The display 814 may act as an interface for the user to see the functioning of the processor 802, or specifically as an interface with the software stored in the memory 804 or in the drive unit 806. A value or image based on the volume rendering (e.g., as shown in FIG. 5) may be output to the user on the display unit 814. For example, an image representing part of the patient with modulation or alphanumeric text representing a calculated value may be indicated in the image.

Additionally, as shown in FIG. 8, the computer system 800 may include an input device 816 configured to allow a user to interact with any of the components of system 800. The input device 816 may be a number pad, a keyboard, or a cursor control device, such as a mouse, or a joystick, touch screen display, remote control or any other device operative to interact with the system 800.

In some embodiments, as shown in FIG. 8, the computer system 800 may also include a disk or optical drive unit 806. The disk drive unit 806 may include a computer-readable medium 810 in which one or more sets of instructions 812 (e.g., software) may be embedded. Further, the instructions 812 may embody one or more of the methods or logic as described herein. In some embodiments, the instructions 812 may reside completely, or at least partially, within the memory 804 and/or within the processor 802 during execution by the computer system 800. The memory 804 and the processor 802 also may include computer-readable media as described above.

The present teachings contemplate a computer-readable medium that includes instructions 812 or receives and executes instructions 812 responsive to a propagated signal, so that a device connected to a network 820 may communicate voice, video, audio, images or any other data over the network 820. Further, the instructions 812 may be transmitted or received over the network 820 via a communication interface 818. The communication interface 818 may be a part of the processor 802 or may be a separate component. The communication interface 818 may be created in software or may be a physical connection in hardware. The communication interface 818 is configured to connect with a network 820, external media, the display 814, or any other components in system 800, or combinations thereof. The connection with the network 820 may be a physical connection, such as a wired Ethernet connection or may be established wirelessly as discussed below. Likewise, the additional connections with other components of the system 800 may be physical connections or may be established wirelessly.

The network 820 may include wired networks, wireless networks, or combinations thereof. The wireless network may be a cellular telephone network, an 802.11, 802.16, 802.20, or WiMax network. Further, the network 820 may be a public network, such as the Internet, a private network, such as an intranet, or combinations thereof, and may utilize a variety of networking protocols now available or later developed including, but not limited to TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of subject matter described in this specification may be implemented as one or more computer program products, for example, one or more modules of computer program instructions encoded on a computer-readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer-readable medium may be a machine-readable storage device, a machine-readable storage substrate, a memory device, or a combination of one or more of them. The term "data processing apparatus" encompasses all apparatuses, devices, and machines for processing data, including but not limited to, by way of example, a programmable processor, a computer, or multiple processors or computers. The apparatus may include, in addition to hardware, code that creates an execution environment for the computer program in question (e.g., code that constitutes processor firmware, a protocol stack, a database management system, an operating system, or a combination thereof).

In some embodiments, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the present teachings are considered to include any one or more of a computer-readable medium or a distribution medium and other equivalents and successor media, in which data or instructions may be stored.

In some embodiments, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In some embodiments, the methods described herein may be implemented by software programs executable by a computer system. Further, in some embodiments, implementations may include distributed processing, component/object distributed processing, and parallel processing. Alternatively, virtual computer system processing may be constructed to implement one or more of the methods or functionality as described herein.

Although the present teachings describe components and functions that may be implemented in particular embodiments with reference to particular standards and protocols, the present invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described herein may be performed by one or more programmable processors executing one or more computer programs to perform functions by operating on input data and generating output. The processes and logic flows may also be performed by, and apparatus may also be implemented as, special purpose logic circuitry, for example, an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The main elements of a computer are a processor for performing instructions and one or more memory devices for storing instructions and data. Generally, a computer will also include, or be operatively coupled to receive data from or transfer data to, or both, one or more mass storage devices for storing data, for example, magnetic, magneto optical disks, or optical disks. However, a computer need not have such devices. Moreover, a computer may be embedded in another device, for example, a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including but not limited to, by way of example, semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, some embodiments of subject matter described herein may be implemented on a device having a display, for example a CRT (cathode ray tube) or LCD (liquid crystal display) monitor, for displaying information to the user and a keyboard and a pointing device, for example a mouse or a trackball, by which the user may provide input to the computer. Other kinds of devices may be used to provide for interaction with a user as well. By way of example, feedback provided to the user may be any form of sensory feedback (e.g., visual feedback, auditory feedback, or tactile feedback); and input from the user may be received in any form, including but not limited to acoustic, speech, or tactile input.

Embodiments of subject matter described herein may be implemented in a computing system that includes a back-end component, for example, as a data server, or that includes a middleware component, for example, an application server, or that includes a front end component, for example, a client computer having a graphical user interface or a Web browser through which a user may interact with an implementation of the subject matter described in this specification, or any combination of one or more such back end, middleware, or front end components. The components of the system may be interconnected by any form or medium of digital data communication, for example, a communication network. Examples of communication networks include but are not limited to a local area network (LAN) and a wide area network (WAN), for example, the Internet.

The computing system may include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 CFR §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding claim—whether independent or dependent—and that such new combinations are to be understood as forming a part of the present specification.

The foregoing detailed description and the accompanying drawings have been provided by way of explanation and illustration, and are not intended to limit the scope of the appended claims. Many variations in the presently preferred embodiments illustrated herein will be apparent to one of ordinary skill in the art, and remain within the scope of the appended claims and their equivalents.

The invention claimed is:

1. A computer-implemented method for iterative Monte Carlo volume rendering, the method comprising:
    tracing, by a computer processor, a plurality of light rays into a scene containing volumetric data, the light rays configured for simulating global illumination;
    randomizing, by a computer processor, a scattering location and a scattering direction of the plurality of light rays through the volume, wherein a common sequence of random numbers is used in order for the scattering direction of each of the plurality of randomized light rays to be substantially parallel;
    computing, by the computer processor, at least one trilinearly interpolated and shaded sample along each of the plurality of randomized light rays based on stored volumetric data, wherein at least a portion of the stored volumetric data used in at least a portion of the computing is configured for coherent memory access;
    rendering, by the computer processor, the volume with the global illumination based on a plurality of iterations of the tracing, the randomizing, and the computing.

2. The computer-implemented method of claim 1 wherein the common sequence of random numbers is obtained by inputting, for each iteration of the randomizing, a common seed number into a pseudo-random number generator.

3. The computer-implemented method of claim 1 wherein the computer processor comprises a plurality of cores.

4. The computer-implemented method of claim 1 wherein the computer processor comprises a graphics processing unit, a multi-core central processing unit, or a combination thereof.

5. The computer-implemented method of claim 3 wherein the plurality of cores is configured to perform parallel processing on the plurality of randomized light rays, and wherein each core of the plurality of cores is independently configured to perform the computing for a respective randomized light ray.

6. The computer-implemented method of claim 1 wherein the common sequence of random numbers is obtained by inputting, for each iteration of the randomizing, a common pre-computed sequence of random numbers used by a random scattering function.

7. The computer-implemented method of claim 1 wherein the common sequence of random numbers is obtained by using, for each iteration of the randomizing, a common set of pre-computed scattered random directions for each respective randomized light ray.

8. The computer-implemented method of claim 1 wherein the stored volumetric data is partitioned into a plurality of voxels, and wherein the plurality of voxels is organized into a plurality of cubic bricks.

9. The computer-implemented method of claim 1 wherein at least a portion of the stored volumetric data used in at least a portion of the computing is stored in a cache.

10. The computer-implemented method of claim 1 wherein at least a portion of the stored volumetric data used in at least a portion of the computing is stored in a common cubic brick.

11. The computer-implemented method of claim 1 wherein the stored volumetric data comprises data selected from the group consisting of computed tomography (CT) data, ultrasound data, magnetic resonance (MR) data, positron emission tomography (PET) data, single photon emission computed tomography (SPECT) data, and combinations thereof.

12. The computer-implemented method of claim 1 wherein, for each iteration of the computing, the method further comprises increasing sample spacing by a fixed amount along each of the plurality of randomized light rays.

13. The computer-implemented method of claim 1 wherein, for each iteration of the computing, the method further comprises increasing sample spacing as a function of distance from a scattering ray origin.

14. The computer-implemented method of claim 1 wherein the method further comprises sub-sampling at least a portion of the stored volumetric data to obtain a lower resolution sub-sample of the portion of the stored volumetric data.

15. The computer-implemented method of claim 14 wherein, if a sample spacing of an initial iteration of the computing is less than a sample spacing of a subsequent iteration of the computing, then the lower resolution sub-sample is accessed for the computing for each of the plurality of randomized light rays.

16. A system for Monte Carlo volume rendering, the system comprising:
    a processor;
    a non-transitory memory coupled with the processor;
    first logic stored in the non-transitory memory and executable by the processor to cause the processor to randomize a scattering direction of a plurality of light rays through a volume to be rendered, the light rays configured for simulating global illumination, wherein a common sequence of random numbers is used in order for the scattering direction of each of the plurality of randomized light rays to be substantially parallel;
    second logic stored in the non-transitory memory and executable by the processor to cause the processor to trace the plurality of randomized scattered light rays through the volume;
    third logic stored in the non-transitory memory and executable by the processor to cause the processor to compute at least one trilinearly interpolated sample along each of the plurality of randomized scattered light rays based on stored volumetric data, wherein at least a portion of the stored volumetric data used in at least a portion of the computing is configured for coherent access; and
    fourth logic stored in the non-transitory memory and executable by the processor to cause the processor to render the volume based on a plurality of iterations of the randomizing, the tracing, and the computing.

17. The system of claim 16 further comprising:
    fifth logic stored in the non-transitory memory and executable by the processor to cause the processor to perform parallel processing on the plurality of randomized scattered light rays, wherein each core of a plurality of cores is independently configured to compute the at least one trilinearly interpolated sample for a respective randomized scattered light ray; and
    sixth logic stored in the non-transitory memory and executable by the processor to cause the processor to derive the scattering direction of each of the plurality of randomized scattered light rays from a pseudo-random number generator based on a common sequence of random numbers.

18. A non-transitory computer-readable storage medium having stored therein data representing instructions executable by a programmed processor for Monte Carlo volume rendering, the storage medium comprising instructions for:
    tracing a plurality of light rays into a scene containing volumetric data, the light rays configured for simulating global illumination;

randomizing a scattering location and a scattering direction of the plurality of light rays through the volume, wherein a common sequence of random numbers is used in order for the scattering direction of each of the plurality of randomized scattered light rays to be substantially parallel;

computing at least one trilinearly interpolated and shaded sample along each of the plurality of randomized scattered light rays based on stored volumetric data, wherein at least a portion of the stored volumetric data used in at least a portion of the computing is configured for coherent memory access;

rendering the volume with global illumination based on a plurality of iterations of the tracing, the randomizing, and the computing.

\* \* \* \* \*